United States Patent Office 3,526,130
Patented Sept. 1, 1970

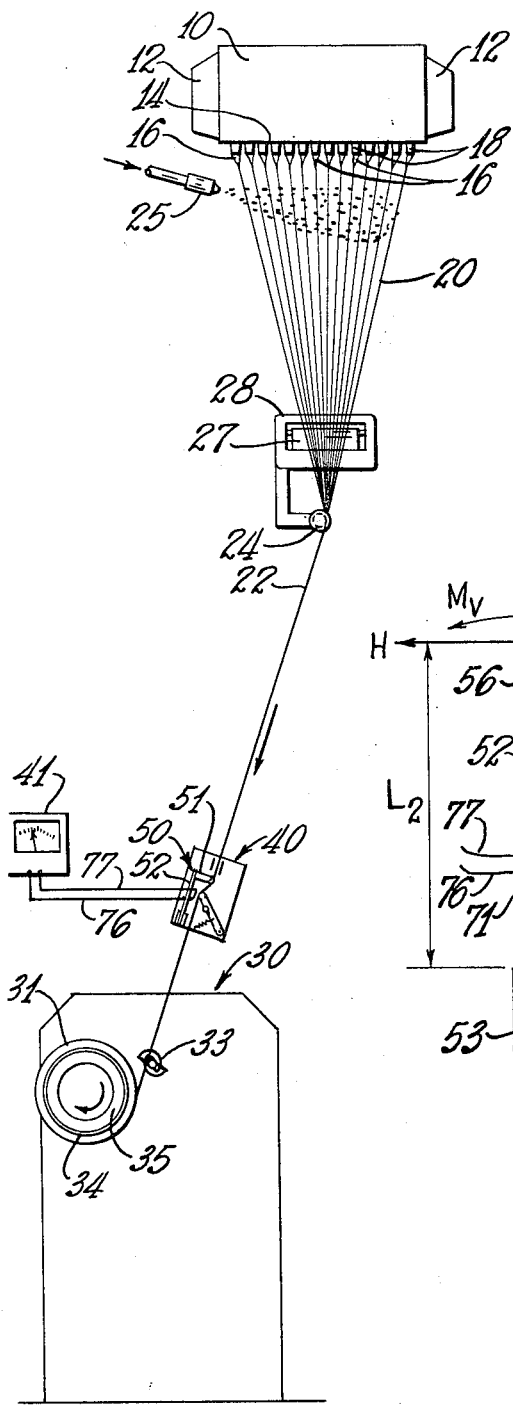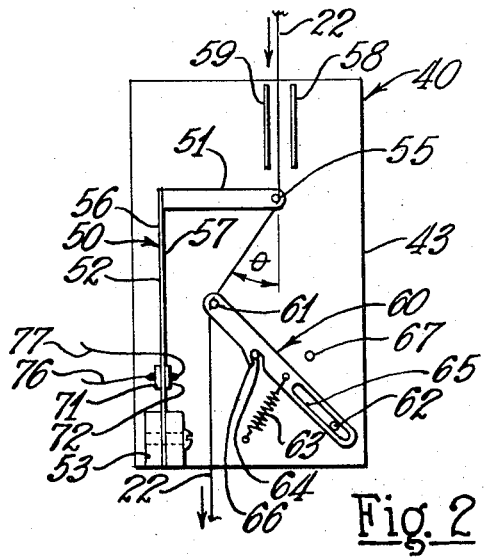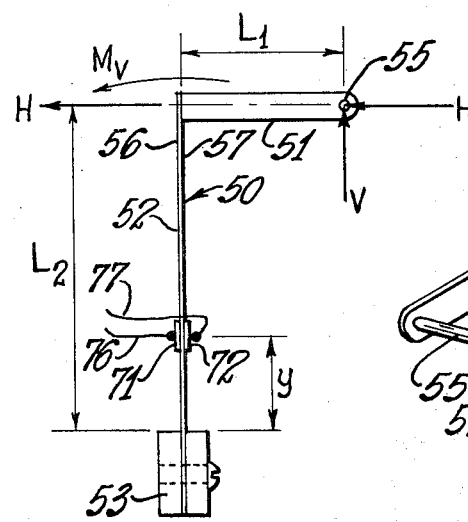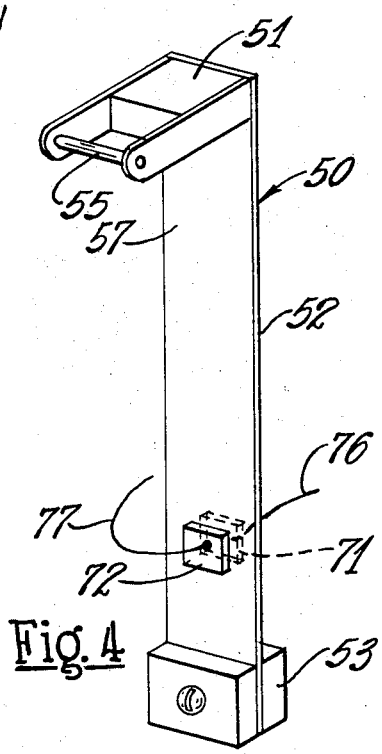
Sept. 1, 1970  S. A. CANFIELD  3,526,130
APPARATUS AND METHOD FOR MEASURING TENSION IN LINEAR MATERIAL
Filed April 8, 1968  2 Sheets-Sheet 1
Fig. 1
Fig. 2
Fig. 3
Fig. 4
INVENTOR.
SHELDON A. CANFIELD
BY
ATTORNEYS

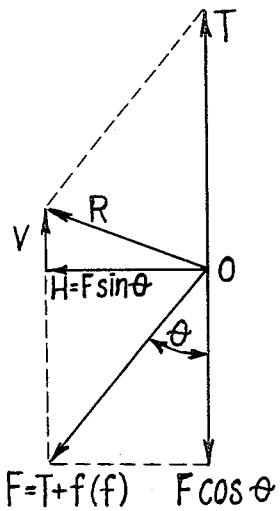
Fig. 5
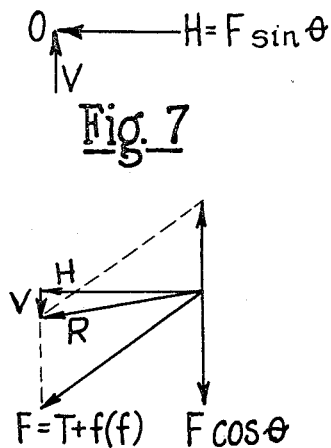
Fig. 7
Fig. 6
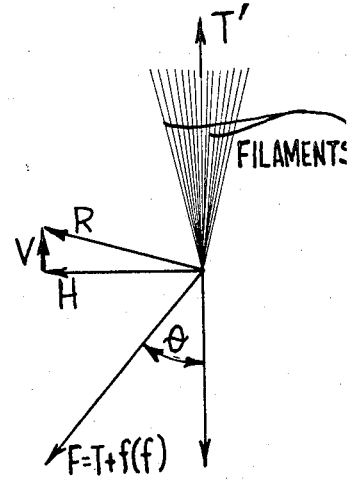
Fig. 9
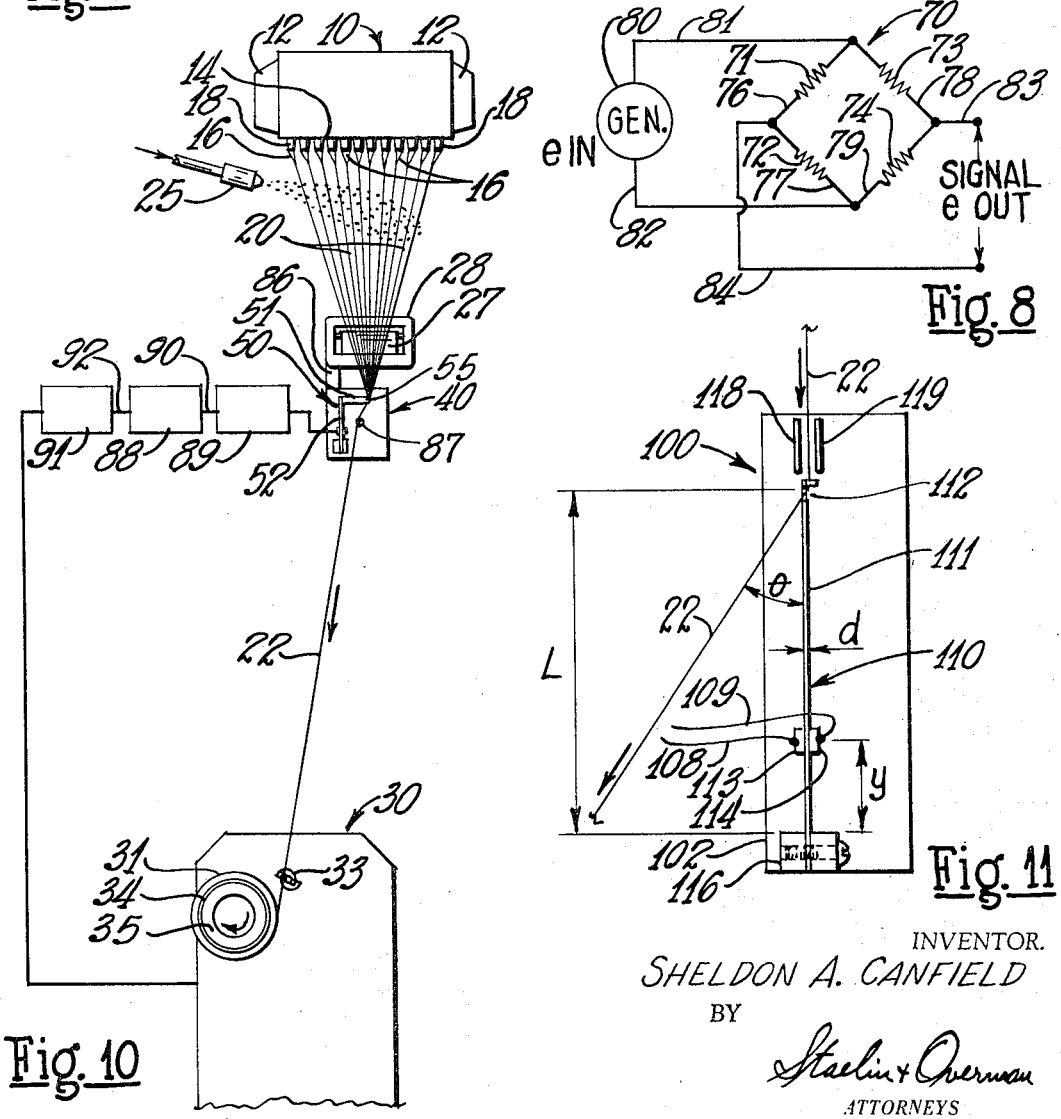
Fig. 8
Fig. 10
Fig. 11

3,526,130
APPARATUS AND METHOD FOR MEASURING TENSION IN LINEAR MATERIAL
Sheldon A. Canfield, Newark, Ohio, assignor to Owens-Corning Fiberglas Corporation, a corporation of Delaware
Filed Apr. 8, 1968, Ser. No. 719,632
Int. Cl. G01l 5/10
U.S. Cl. 73—144                               9 Claims

ABSTRACT OF THE DISCLOSURE

Apparatus and method for measuring tension in linearly extended flexible material where a member is strained by bending the material on means associated with the member and sensing the strain in the member as an indication of the magnitude of tension in the material.

BACKGROUND OF THE INVENTION

The present invention pertains to method and apparatus for measuring tension in linear material and more particularly relates to method and apparatus for measuring tension in linear material, including traveling linear material, that may include means responsive to such measured tension for keeping a substantially constant tension in the material.

It is possible to arrange apparatus measuring tension in linear material into two broad categories, viz direct and inferential. Direct tension measuring apparatus directly measures tensile force in linear material. Inferential tension measuring apparatus infers tension in linear material from properties and relationships of the material that can be related to tension in the material.

The use of direct tension measuring apparatus is limited. Such apparatus normally employs a mechanical force balancing system wherein known forces balance unknown tensile force in the material. The determined balancing force becomes the measured tensile force in the linear material. The apparatus employs pulleys and springs in determined relationship, certain portion or portions of the apparatus being displaced to balance the tensile forces in the material traversing the apparatus. Such a system tends to include errors of friction in the measured force, actual tensile force in the particular linear material being included as a component of a measured or determined force. Moreover, the mechanisms of a mechanical force balance system do not readily respond to rapid changes in tensile force present in linear material traveling at high linear speeds.

There are limitations in the use of inferential tension measuring apparatus. Such apparatus normally depends upon a fairly large number of varying factors. For example, if the mass per unit length of a linear material is known, the material can be vibrated to produce standing waves along its length. Inferential tension measuring apparatus deduces tension in the linear material by analysis of the waves through use of string equations. Such apparatus is not easily used, especially under conditions where the linear material travels at high linear speeds.

Because of the inherent limitations in the apparatus measuring tension in linear material, e.g. traveling linear material, control means responsive to tension in such material is now known, especially under conditions of high linear speeds.

SUMMARY OF THE INVENTION

It is an object of the present invention to provide an improved method and apparatus for measuring the tensile forces in linear material.

It is another object of the present invention to measure tensile forces in linear flexible material as a function of strains induced by the linear material in an associated member.

It is yet another object of the present invention to measure tensile forces in traveling linear flexible material by turning the linear material a predetermined angular amount on a surface to induce strains in an associated longitudinal member at a location along its length where the strains indicate tensile forces in the traveling linear material.

It is another object of the invention to provide control means responsive to tensile forces in traveling linear flexible material keeping the tensile force in the material substantially constant.

These and other objects are attained by apparatus and method changing the path of linear material a predetermined angular amount on suitable means to induce strains in a member operably associated with the suitable means and sensing the strain in the elongated member at a location where the strain in the elongated member indicates the tensile forces in the linear material supplied to the surface.

The present invention has advantages over the prior art. The apparatus responds to quickly changing tensile forces in linear material traveling at high linear speeds up to ten thousand feet per minute and more. Moreover, the apparatus is simple in construction and therefore sturdy.

The present invention is particularly useful in making glass fibers, especially in a process for forming continuous glass filaments where such filaments are attenuated from streams of molten glass provided from a supply of molten glass. Suitable means gathers the filaments into a strand which are collected by suitable winding or advancing means at speeds from several thousand to ten thousand or more feet per minute. Variations in linear speed of the advancing strand (filaments) changes the tensile forces in the material, such variations affecting the diameter of the filaments themselves as they are attenuated from the streams of molten glass. The method and apparatus of the invention include means responsive to the measured tensile forces acting to modulate process conditions to keep the tensile forces in the advancing linear material such as glass strands substantially constant for more uniform filament diameters.

These and other objects and advantages of the invention will be apparent as the invention is hereinafter described in more detail with reference made to the following drawings.

DESCRIPTION OF THE DRAWINGS

FIG. 1 is a somewhat diagrammatic view in elevation showing apparatus for measuring tension in linear material according to the principles of the invention used in a process for forming and packaging a continuous filament strand of heat softenable mineral material such as glass;

FIG. 2 is an enlarged view in elevation of the apparatus for measuring tensile forces in traveling linear material as shown in FIG. 1;

FIG. 3 is a further enlarged view illustrating the transducer arrangement shown in FIG. 2;

FIG. 4 is a view in perspective of the transducer arrangement shown in FIG. 3;

FIG. 5 is a vector diagram showing both tensile forces in a linear material turned on a surface through an angle $\theta$ and the forces acting on such surface because of the turning of the material;

FIG. 6 is a vector diagram representing a modified diagram as illustrated in FIG. 5;

FIG. 7 is a diagram showing the components of force vectors as they are considered to operate on the turning surface;

FIG. 8 is a diagrammatic view of a suitable electrical circuit for providing an electrical signal indicating strains induced in a member according to the principles of the invention;

FIG. 9 is a vector diagram representing tensile forces involved using the invention as a gathering point for individual filaments according to the principles of the invention; and FIG. 10 is a somewhat diagrammatic view in elevation of a process for forming and packaging continuous filament strand of heat softenable mineral material such as glass using the apparatus of the invention as a control device keeping the tensile forces along individual glass filaments substantially constant; and FIG. 11 is a somewhat diagrammatic view in elevation of a modified form of apparatus for measuring tension in linear material according to the principles of the invention.

DESCRIPTION OF THE PREFERRED EMBODIMENTS

While the method and apparatus of the invention are particularly valuable in processes for forming filaments of heat softened mineral material such as glass where the individual filaments are combined to form a strand prior to collecting the material as a wound package, the method and apparatus may be employed to measure the tensile forces in any linear material from any suitable source and including various materials, e.g. nylon. Thus, the use of a glass strand in a glass filament forming process to explain the operation of the invention is by example only.

FIG. 1 shows a process for forming continuous glass filaments from heat-softened glass where the glass filaments are combined into a strand and subsequently collected as a wound package. In FIG. 1 a container or feeder 10 holds a supply of molten glass. The container 10 may be connected to a fore hearth (not shown) that supplies molten glass to a furnace or may be connected to a means for supplying glass (not shown) such as marbles that are reduced to a heat-softened condition in a melter or other means associated with the feeder or container 10. The container 10 has terminals 12 located at its ends that connect to a source of electrical energy to supply heat by conventional resistance heating to the glass held in the container 10, such heat maintaining the molten glass at a proper fiber forming temperature and viscosity. Further, the container 10 has a stream feeding bottom or tip section 14 including a plurality of orifices or passageways for delivering streams 16 of the molten glass from the container 10. As shown in FIG. 1 the orifices in the bottom 14 comprise a plurality of depending orificed projections or tubular members 18.

The molten streams 16 are attenuated into individual continuous glass filaments 20 and combined into a bundle or strand 22 by a gathering shoe 24 located below the feeder or container 10.

While the filaments 20 may be protected only by application of water to them, it is desirable in most instances to apply to them a conventional size or other coating material. A nozzle 25 may be located near the bottom 14 to spray water onto the newly formed filaments 20, preferably prior to combining the filaments 20 into the strand 22. An applicator 27 supported within a housing 28 may be provided as shown in FIG. 1 to apply sizing or coating material to the filaments 20. The applicator 30 may be any suitable means known to the art such as an endless belt that moves through the sizing or coating fluid held in the housing 28. As the filaments 20 pass across the surface of the applicator 27, some of the fluid on the applicator 27 transfers to them.

The strand 22 collects as a wound package 31 on a winding machine 30. Strand handling apparatus 33 moves the advancing strand 22 back and forth along the length of the package 31 as the strand winds upon a collector such as a tube 34 that has been telescoped over a spindle or collet 35, the collet 35 being journaled for rotation on the winding machine 30 and rotated thereby.

As shown in FIG. 1 the advancing strand 22 passes across a unit 40 measuring tensile forces in the stand 22 above the unit 40. The tension measuring unit 40 includes a transducer arrangement 50 and a strand guide system mounted on a suitable support means. A suitable indicator device provides a reading corresponding to the output of the transducer arrangement 50.

Referring to FIGS. 2 through 4, the transducer arrangement 50 as illustrated includes two cooperating intersecting and connected longitudinal members or legs 51 and 52 held on a plate 43 where the leg 52 is shown as a vertical member and the leg 51 is shown as a horizontal member. The legs join in right angular relation at an end region. A securing block 53 on the plate 43 fixes the transducer arrangement 50 of the legs 51 and 52 to the plate 43 by grasping the leg 52 at the end remote from the intersection with the leg 51. Accordingly, the transducer 50 can be considered as comprising a cantilever arrangement where the leg 51 is supported on the leg 52. Thus, the leg 51 represents a suitable means engaging the strand 22 and imparting a bend to the strand 22.

The leg 51 is arranged to contact a strand, the tension of which is to be indicated. Thus the leg 51 is provided with a strand turning surface in the form of a graphite shoe 55 located at its free end. The advancing strand 22 turns on the shoe 55 as it travels across the measuring unit 40. As more clearly shown in FIG. 4 the graphite shoe 55 is a longitudinal member having an arcuate surface over which strand 22 moves. While the shoe 55 is illustrated as a non-rotating member, if desired it can also be rotatably mounted on the free end of the arm 51. Graphite is used because of its low abrasion to glass, particularly wet glass. The leg 51 itself is a sturdy, rigid member of convenient predetermined length usually made of suitable non-corrosive material such as metal or plastic.

The leg 52 is a somewhat flexible member in which forces acting on the transducer arrangement 50 by the strand 22 upon the shoe 55 induce stresses (strains). The leg 52 is a fairly thin longitudinal member having major surfaces 56 and 57. It is of convenient length and normally is constructed of non-corrosive material such as stainless steel with a thinness giving the member a springy quality. Thus, the leg 52 is adapted to being strained.

The strand guide arrangement includes means for directing the strand 22 to the shoe 55 and away therefrom along desired paths. Guide means 58 and 59, which may be rails or merely lines, define a path to the shoe 55 for the strand 22 that is perpendicular to the longitudinal axis of the contact arm 51.

The guide means directing the strand path after its departure from the shoe 55 includes an arm 60 and a shoe 61. The arm 60 movably mounts to the plate 43 on a pin 62 at one end to the lower left end corner of the plate 43. The arm 60 has a slot 65 into which the pin 62 fits in slideable relation. The shoe 61 is preferably graphite like the shoe 55 of the leg 51. The shoe 61 extends across the free end of the arm 60. A strong tension spring 63 connected at one end to the arm 60 intermediate the arm's ends and the other end to the plate 43 urges the arm 60 into operating position against a post 64, which is located at a predetermined location on the plate 43 as more fully discussed hereinafter. The post 64 fits in a notch 66. When the arm 60 is not in position against the post 64, the arm 60 is moved to have the notch 66 engage post 67 to keep the arm 60 in a substantially vertical position away from the strand 22.

The arrangement positioning the shoe 61 controls the amount of turn, i.e. the angle $\theta$ shown in FIG. 2, the strand path changes upon the surface of the shoe 55. The paths of the strand 22 to and from the shoe 55 are important. The strand 22 may leave the shoe 61 along any convenient path that does not interfere with the leg 52.

The invention uses the relationship between the tensile forces in linear material, e.g. a strand 22, and the resulting forces acting on a load bearing structure, e.g. the transducer arrangement 50 including the legs 51 and 52, due to turning the material a predetermined angular amount on a surface, e.g. the shoe 55. The invention can be more completely understood by examining the relationship between the tension in the advancing strand 22 and the stresses brought about in the leg 52 of the transducer arrangement 50 as the path of the strand 22 changes across the surface of the shoe 55.

FIG. 5 includes the vector forces acting on any point or surface O caused by linear material traveling thereover wherein its path is turned, i.e. the material bent on, the point or surface O and further showing tensile forces in the material itself. Under dynamic conditions a pulling means advancing linear material induces a tensile force vector F in the linear material along the direction of movement of the material away from point O as indicated. In FIG. 5 the original vertically downward path of the linear material changes or turns through an angle $\theta$. Because of the force vector F, a tensile force vector T results in the linear material above the point O, i.e. provided to point O. Since there is friction at point O, the magnitude of the force vector F equals the magnitude of the force vector T plus a function of friction. The friction does not effect T, which represents tension in the material upstream or prior to the point O. If extended linear material does not advance, the friction factor is zero and T equals F.

The forces acting on the point O include a force vector R, which is the resultant of the force vectors T and F. As shown in FIG. 5, the force vector R has a direction from the point O to the left and somewhat above the horizontal. The force vector R resolves into its rectangular components V and H where V is the vertical component and H is the horizontal component. Because of the direction of the force vector R, the vector component V has a direction vertically upwardly and the vector component H has a direction horizontally to the left.

Since the force vectors V and H are the rectangular components of the force vector R and R itself is the resultant force vector from the force vectors T and F, it can be seen that V and H change in magnitude together with changes in direction or magnitude of either T or F. The vectors H and V can be considered as acting on the point O as shown in FIG. 7.

While under operating conditions the direction of H remains with a direction in the horizontal to the left, the direction of V may change. For example, under certain conditions a change in the force vector F will change the direction of V. The force vector F includes in its magnitude T plus a function of friction; therefore, it is possible under conditions of large functions of friction that the vector diagram of FIG. 5 may become modified as shown in FIG. 6, where F has become so large in magnitude as to result in a force vector R having a direction extending below the horizontal. Under such conditions the vertical component V has a direction vertically downwardly. The force vector H continues to have a direction horizontally to the left; however, the magnitude of H is much greater than conditions where V is directed vertically upward. During conditions that R extends horizontally to the left, V will have zero magnitude.

From the vector diagrams of FIGS. 5 and 6 it can be seen that tensile forces, i.e. tension, in any linear material turned or bent on a point or surface O can be expressed as a relationship between the components H and V of the force vector R and the angle $\theta$. The vertical component V can be stated in terms of F, T and a trigonometric function of the angle $\theta$:

(1) $\quad F \cos \theta = T \pm V \text{ or } \pm V = F \cos \theta - T$

Where $\theta$ is any predetermined change in the direction of linear material across the surface or point O from the original path of the material prior to the point O and component V is considered plus in the vertically upward direction and minus in the vertically downward direction. The horizontal component H can be stated in terms of the force vector F and a trigonometric function of the angle $\theta$:

(2) $\quad H = F \sin \theta$

When Equation 2 is divided into Equation 1, one obtains:

(3) $\quad \dfrac{F \cos \theta}{F \sin \theta} = \dfrac{T \pm V}{H}$

When F cancels and Equation 3 is solved for T, one obtains:

(4) $\quad T = H \left( \dfrac{\cos \theta}{\sin \theta} \right) \pm V \text{ or } T = H \cot \theta \pm V$ The Equation 4 expresses the tensile force T in linear material such as the strand 22 in terms of the rectangular components (H and V) of the resultant force (R) acting upon a turning surface or point on which the linear material turns through an angle $\theta$. Because H and V reflect the force vector F and the force vector F includes T plus a function of friction at the point O, the tensile force T as expressed in Equation 4 also includes the operation of friction.

As the strand 22 turns on the shoe 55, the relationship expressed in relation to FIGS. 5 through 7 holds true. The force vectors F and T in the strand 22 gives rise to rectangular components V and H of the resultant force vector R, which induce strain in the leg 52 through the leg 51. Moreover, for any given angle $\theta$ there is a location along the length of the leg 52 that under conditions of the strand 22 turning on the shoe 55 there are provided strains indicating T as expressed in the Equation 4. Thus, in a very real sense the invention solves the Equation 4 in terms of strain, which is read on an appropriate device as tensile force, e.g. pounds, etc.

Referring to FIG. 3, the components V and H, i.e. the resultant R of the force vectors F and T, acting on the shoe 55 as the strand 22 turns on the shoe 55 gives rise to bending moments in the leg 52. Assuming the leg 51 is a simple cantilever secured at its point of intersection with the leg 52 and the component V acts vertically upwardly as shown in FIG. 3, there is developed in leg 51 a maximum moment $M_v$ at the end connected to the leg 52 equal to V times $L_1$, where $L_1$ is the effective length of the leg 51. The FIG. 3 shows $L_1$. The bending moment $M_v$ at the end of the leg 51 is a couple that induces a constant bending moment at any point along the length of the leg 52. While the position of the application of the force vector H to the transducer arrangement 50 is the shoe 55 on the free end of the leg 51, one can consider the point of application of the force vector H for bending moment purposes in the leg 52 to be at the intersecting end of the leg 52 as shown in FIG. 3. The bending moments caused by H in the leg 52, i.e. $M_h$, increase linearly the greater the distance away from the end of the leg 52 along the length thereof. Maximum bending moment due to H occurs at the point of securement of the leg 52 to the block 53, or in other words, at a distance $L_2$ from the point of application of the force vector H, where $L_2$ is the effective length of the leg 52.

Because flexure stresses (within proportional limits) in a cantilever are a function of force per unit area, the stress at any point along the length of the leg 52 is an expression of the bending moment at that point divided by the section modulus of the leg 52, i.e. $S = M/Z$. Hence, at any point y distance away from the block 53 along the length of the leg 52 the stress in the leg 52 is equal to $M/Z$. Since the bending moment M in the leg 50 at a location y distance from the block 53 comprises the sum of the moments due to external couples and forces caused by force vectors V and H acting on the leg 52 at the y location y distance from the block 53, one can express stress at such point as:

(5) $$St = \frac{M_v + M_h}{Z} \text{ or } \frac{H(L_2 - y) + V(L_1)}{Z}$$

Where $S_t$ is the total stress in the leg 52 at the point y distance from the block 53, Z is the section modulus of the leg 52 and $M_v$ and $M_h$ are the bending moments at the point due to force vectors V and H respectively.

It has been determined that the stress at a point any y distance from the block 53 along the leg 52 indicates the tension T in linear material, e.g. the strand 22, provided:

(6) $$\frac{L_2 - y}{L_1} = \cot \theta$$

Where $L_1$ is the effective length of the leg 51 and $L_2$ is the effective length of the leg 52. Under such conditions a comparison can be made with Equation 5, which upon moving terms can be expressed:

(7) $$\frac{S_t Z}{L_1} = H\left(\frac{L_2 - y}{L_1}\right) + V$$

Under the conditions of $$\frac{L_2 - y}{L_1} = \cot \theta$$

a comparison of Equation 7 with Equation 4 reveals at least the following equalities:

(8) $$T = \frac{S_t Z}{L_1} = H\left(\frac{L_2 - y}{L^2}\right) + V = H \cot \theta + V$$

Where V can be either plus or minus. Thus, it can be seen that for any given amount of turn, i.e. angle $\theta$, on a surface there is a location along the length of an associated member that reflects stress induced by the material by such turning wherein the induced stress indicates the tensile force T in the linear material, e.g. the strand 22. Such location is referred to as the tensile force indicator location. For a given $L_1$ and $L_2$, the distance y changes with a change in the angle $\theta$. In practice, a fixed predetermined $\theta$ is normally employed. Note that the expression in 8, is independent of the magnitude of the friction function.

Because within the proportional limits stress is proportional to strain it has been convenient to use strain sensitive material or gauges positioned at the tensile force indicator location, i.e. material exhibiting a piezoresistance, to sense the strain in the leg 52 as an indicator of the magnitude of tension in linear material, e.g. the strand 22. Such material changes electrical resistivity with an applied strain, either static or dynamic. The electrical resistance increases under tension and decreases under compression.

As shown in FIGS. 2 through 4 there are two piezoresistive elements or strain guages 71 and 72 are on the major surfaces 56 and 57 respectively of the leg 52 at the tensile force indicator location. As the leg 52 moves by slight bending in either direction through the effect of the strand 22 across the shoe 55 of the leg 51, one of the strain guages 71 and 72 is always in compression and the other always in tension. The greater the induced stresses, i.e. strains, in the leg 52 (which are a result of both V and H), the greater the change in the resistance of the strain guages 71 and 72.

FIG. 8 illustrates an electrical circuit including a bridge 70 that can be used to generate an electrical signal proportionate to the strain in the leg 52 at the tensil force indicator location, i.e. the tensile force T in linear material such as the strand 22 turning an angle $\theta$ on the shoe 55 of the leg 51. The bridge 70 provides a voltage output or signal proportionate to the product of an excitation voltage and the resistance changes of the strain gauges. As shown in FIG. 8 the bridge 70 is a four arm bridge that includes an arm 76 with the strain gauge 71; an arm 77 with the strain gauge 72; an arm 78 with a resistor 73; and an arm 79 with a resistor. A suitable voltage source such as a generator 80 supplies a voltage ($e_{in}$) across the bridge 70 through lines 81 and 82. The voltage in, $e_{in}$, is preferably a constant D.C. voltage. Lines 83 and 84 carry a voltage signal ($e_{out}$) from the bridge 70.

The design of the bridge 70 permits a voltage signal out only during times that strains occur in the leg 52. Because in the unstressed state the resistance of the gauges 71 and 72 and the resistance of the resistors 73 and 74 are equal (i.e. resistance in 71 equals resistance in 72 equals resistance in 73 equals resistance in 74), the voltage drop across the arms 76 and 77 equals the voltage drop across the arms 78 and 79; therefore, there is no signal out. When the leg 52 is strained, changes occur in the resistance of the strain gauges 71 and 72. Since one gauge, e.g. 71, is under compression and the other subjected to tension, ideally the magnitude of the change in resistance is the same for each gauge but of opposite signs. Because there is a resistance difference or unbalance in the bridge 70, a signal out ($e_{out}$) occurs that is proportonate to the strain (stress) in the leg 52 at its tensile force indicator location for the particular angle $\theta$. Hence the magnitude of the signal out, $e_{out}$, is a measure of the tensile force T measured in terms of strain in the leg 52 by the strand 22 turning on the shoe 55 of the leg 51.

An appropriate indicator such as a potentiometric device shows e out as tensile force in pounds.

FIG. 10 shows the glass fiber forming position of FIG. 1 with the tension measuring unit 40 functioning as a filament gathering device and further where the unit 40 is in a circuit controlling the tension in the group of traveling filaments 20. The molten streams 16 supplied from the molten glass held in the container 10 are attenuated into the continuous glass filaments 20 and combined into a single bundle or strand 22 as the filaments 20 are combined at the shoe 55 on the leg 51 of the tension measuring unit 40, which is located below the container 10. As illustrated in FIG. 10 support means 86 connects the tension measuring unit 40 to the applicator housing 28.

The stand 22 collects as a wound package 31 on the winding machine 30. The strand handling apparatus 33 moved the advancing strand 22 back and forth along the length of the package 31 as the strand 22 winds as a package upon the collection tube 34 on the collet 35.

The tension measuring device 40 is in a circuit controlling the tension in the filaments 20. As shown in FIG. 10, the signal out, $e_{out}$, from an electrical circuit such as the bridge circuit 70 shown in FIG. 8 is a control signal used for regulating the rotational speed of the collet 35 to keep a constant tension in the filaments 20. The signal out may also be employed to modulate the temperature of the bottom 14 of the container 10 for regulating the viscosity of the molten glass held therein, thereby keeping the tension of the filaments 20 substantially constant.

In FIG. 10 the operation of the unit 40 is as explained with respect to its use in the arrangement of FIG. 1 and the vector diagram of FIG. 5 except that all the filaments 20 above the unit 40 are under individual tensile stresses or forces that give rise to a total effective force T', which represents a composite of all the tensile forces in each of the filaments 20 acting in and average vertical direction upwardly as suggested in the vector diagram of FIG. 9.

The filaments 20 combine to form a strand 22 over the shoe 55 on the leg 51 and turn on the surface of the shoe 55 a predetermined amount, angle $\theta$, from the vertical towards the leg 52. After the strand 22 leaves the shoe 55, it turns again away from the leg 52 on a stationary guide shoe 87, e.g. a graphite rod, positioned on the plate 43 to provide the direction of the strand 22 away from the shoe 55 as in the case of the movable shoe 61 on the arm 60 shown in FIG. 2.

The electrical signal out, $e_{out}$, from an electrical circuit such as the bridge circuit 70 provides an electrical signal proportionate to the strain in the leg 50 at the tensile force indicator location, and hence proportionate to the tensile force T', to an amplifier 88 from an electrical circuit box 89 through line 90. The amplifier 88 provides an amplified electrical signal, $Ke_{out}$, to a controller 91 through a line 92. K is a constant provided by the amplifier 88. The controller 91 operates in a known manner to increase or decrease the rotational speed of the collet 35 as the signal out from the box 88 ($Ke_{out}$) changes, a constant tension T' being maintained.

FIG. 11 shows a modified form of the invention. The strand 22 induces strains (stresses) in a longitudinal member as the strand 22 turns on a surface operationally connected to the longitudinal member. Suitable means measures the induced strains at a location along the length of the longitudinal member where the strains indicate the tension in the strand 22 provided to the surface, i.e. the tension measuring apparatus.

In FIG. 11 is shown a tension measuring unit 100 that includes a transducer 110 and guide arrangement mounted on a suitable support plate 102.

The transducer 110 includes a single longitudinal member 111 and strain gauges 113 and 114 located on the major surface of the member 111.. The gauges are electrically connected through lines 108 and 109 to an indicator such as indicator 41 shown in FIG. 1. A securing block 116 on the support plate 102 fixes one end of the longitudinal member 111 on the plate 102. Thus, like the longitudinal member 52 shown in FIGS. 1–4 and 10, the member 111 is supported at one end only on a support, e.g. support plate 102. At the other end of the longitudinal member 111 is an opening or passageway 112 having rounded edges and through which linear material such as the glass strand 22 passes. The longitudinal member 111 is a somewhat flexible member normally made of a non-corrosive material such as stainless steel that is thin enough to give the member a springy quality.

As illustrated in FIG. 11 the strand 22 turns on the surface of the passageway or opening 112. The strand 22 is supplied to the opening along a predetermined path and turns a predetermined angular amount on the surface of the passageway 112, i.e. turning surface. The amount of turn, i.e. angle $\theta$, may be controlled such as by the location of the unit 100 in relation to a collection position, e.g. the winder 30 of FIG. 1.

As shown the guide arrangement includes two spaced apart guide rails 118 and 119 defining a desired path to the opening 112. As illustrated the path is substantially parallel to the member 111. Any suitable guide arrangement defining a desired path of linear material such as the strand 22 to the turning surface of the passageway 112 may be employed.

Turning the strand 22 on the surface of the passageway 112 induces stresses in the longitudinal member 111. Such turning on the surface of the passageway 112 gives rise to the force vectors V and H acting on the turning surface as in the case of turning the strand 22 on the surface of the shoe 55. Here, however, the force vector V acts longitudinally of the member 111 to either compress the member 111 or subject it to tension depending upon the direction of the force vector V. The operation of the force vector H remains that of producing flexure stresses in the member 111.

The stresses in the longitudinal member 111 are a combination of flexure stresses from the force vector H and either compression or tension stresses from the force vector V. Thus the stresses in the longitudinal member 111 at a point $y$ distance from the block 116 (end of the member 111) can be expressed as:

(9) $$S_t = S_h + S_v = \frac{M_h}{Z} \pm \frac{V}{A} \text{ or } \frac{M_h}{Z} \pm \frac{dV}{6Z}$$

where $S_t$ is the total stress at the point $y$, Z is the section modulus of the member 111, $M_h$ is the bending moment in the member 111 at point $y$ distance from the secured end of the longitudinal member 111 and A is the transverse cross sectional area of the member 111 which can be expressed as $6Z/d$ and where $d$ is the thickness of the member 111. When terms are substituted Equation 9 can be stated:

$$S_t = \frac{H}{Z}(L-y) \pm \frac{dV}{6Z} \text{ or } S_t \frac{6Z}{d} = 6H(L-y) \pm V$$

where L is the effective length of the member 111 as shown in FIG. 11.

It has been determined that stress at a point $y$ distance from the secured end of the member 111 indicates the tension T in the strand 22 provided:

(11) $$6(L-y) = \cot \theta$$

Under such conditions Equation 10 can be compared with Equation 4 and at least the following equalities expressed:

$$T = S_t \frac{6Z}{d} = H[6(L-y) \pm V = H \cot \theta \pm V$$

Where V can be plus or minus. Thus, it can be seen that for any angular turn, i.e. angle $\theta$, of linear material across a surface there is a location along the length of a member operably associated with the surface wherein the induced stress by the turning of the linear material indicates the tensile force T in the linear material, i.e. the tensile force indicator location. Again, within proportional limits stress is proportionate to strain and is employed as the indicator of tensile forces in linear material. For a given L and $6(L-y)$ the tensile force indicator location changes with changes in the angle $\theta$. In practice, a fixed predetermined angle $\theta$ is normally employed for ease in the use and location of the strain gauges 113 and 114.

The modified form of the invention shown in FIG. 11 may be both employed as a filament gathering device and may be in a circuit controlling the tension in a group of traveling filaments such as a glass strand 22 at a glass filament forming position as shown in FIG. 10.

In view of the foregoing, it will be recognized that while particular embodiments of the invention have been shown, many modifications may be made within the concept of the invention; therefore, it is not the intent to limit the invention to specific embodiments.

I claim:

1. Apparatus for measuring tension in linearly extended flexible material comprising:
    a first member supported at a given region, the first member having a flat surface;
    a longitudinal member projecting generally normally from the flat surface and having a surface for engaging tensioned material to impart a bend thereto;
    means for aligning the tensioned material to extend along a path to the surface in a direction substantially perpendicular to the longitudinal member; and
    means for sensing the strain of the first member imparted by bending the material on the surface of the longitudinal member as an indication of the magnitude of tension in the material in the path extending to the surface of the longitudinal member.

2. Apparatus for measuring tension in advancing linearly extended flexible material comprising:
    a longitudinal member supported at one end only;
    means for aligning the linear material to extend along a path in a direction substantially parallel to the longitudinal member;
    means connected to the longitudinal member for engaging the tensioned material to impart a bend thereto, bending the material inducing strain in the longitudinal member; and means for sensing the strain of the member imparted by the material as an indication of the magnitude of tension in the material advancing to the means engaging the material.

3. Apparatus recited in claim 2 where means for sensing the strain includes at least one strain gage.

4. Apparatus for measuring tension in advancing textile material comprising:

a longitudinal member supported at one end only;

means for aligning the linear material to advance along a path extending in a direction substantially parallel to the longitudinal member;

means laterally extending from the longitudinal member for engaging the tensioned material to impart a bend thereto, bending the material inducing strain in the longitudinal member; and a strain gage on opposite sides of the longitudinal member to sense the strain of the member imparted by the material as an indicator of the magnitude of tension in the material advancing to the laterally extending means.

5. Apparatus for measuring tension in flexible linear material comprising:

a first longitudinal member;

means supporting the first longitudinal member at one end only;

a second longitudinal member projecting normally from the first longitudinal member for engaging and imparting a predetermined angular turn to the material, turning the linear material on the second longitudinal member inducing strain in the first longitudinal member;

means for aligning the linear material extending to the second member along a path extending in a direction substantially parallel to the first longitudinal member without touching the material; and means providing an indication of strain in the first longitudinal member at a location along its length where the amount of strain indicates the tension in the linear material extending to the second member.

6. Apparatus for measuring tension in flexible linear material comprising:

a first longitudinal member;

means supporting the first longitudinal member at one end only;

a second longitudinal member projecting laterally from the first longitudinal member for engaging the linear material on its end surface spaced from the first longitudinal member;

means for turning the linear material on the engaging end surface of the second longitudinal member a predetermined angle towards the first longitudinal member, turning the linear material inducing strain in the first longitudinal member; and means sensing strain in the first longitudinal member as an indication of the tension in the material extending to the engaging end surface at a location along its length disposed a distance from the intersection of the longitudinal members such that the ratio of the magnitude of such distance to the magnitude of the length of the second longitudinal member laterally projecting from the first longitudinal member is numerically equal to the contangent of angle of turn of the material on the end surface of the second longitudinal member.

7. A method for measuring tension in extended flexible linear material comprising:

advancing the material along a path laterally spaced from and running substantially parallel to a longitudinal member;

turning the material a predetermined angle towards the longitudinal member on a surface associated with the member and laterally disposed therefrom;

inducing strain in the longitudinal member as the material turns on the surface; and sensing the strain of the longitudinal member as an indication of the magnitude of tension in the material advancing to the surface.

8. Apparatus for measuring the tension in linearly extending flexible material comprising:

a member supported at one end only, the member having an opening at the other end through which linearly extending flexible material extending to the apparatus passes, the material bending on the member as it extends through the opening inducing strain in the member; and means sensing strain in the member at a location on the member spaced a distance from the location on the surface defining the opening and upon which the flexible material turns as the material extends through the opening such that six times the magnitude of such distance is numerically equal to the cotangent of the angle of bend of the material on the member.

9. A method of measuring tension in extended flexible linear material comprising:

advancing the material to a surface connected to a longitudinal member along a path extending in a direction substantially parallel to the longitudinal member;

turning the material a predetermined angle on the surface to induce strain in the longitudinal member; and sensing the amount of strain of the longitudinal member as an indication of the magnitude of tension in the material advancing to the surface.

References Cited

UNITED STATES PATENTS

| | | | |
|---|---|---|---|
| 2,339,590 | 1/1944 | Thomas et al. | |
| 2,809,519 | 10/1957 | Raestner | 73—144 X |
| 3,376,740 | 4/1968 | Harvey | 73—144 |

JERRY W. MYRACLE, Primary Examiner